(12) United States Patent
Thobe

(10) Patent No.: US 7,905,144 B2
(45) Date of Patent: Mar. 15, 2011

(54) MEASURING DEVICE, AND CONDUCTIVITY MEASURING DEVICE, FOR DETERMINING FLOW CAPACITIES OF ELECTROCONDUCTIVE LIQUIDS, MEASURING ELEMENT, AND METHOD

(75) Inventor: Bernhard Thobe, Baringhausen (DE)

(73) Assignee: Brita GmbH, Taunusstein (DE)

(*) Notice: Subject to any disclaimer, the term of this patent is extended or adjusted under 35 U.S.C. 154(b) by 543 days.

(21) Appl. No.: 11/989,273

(22) PCT Filed: Jul. 25, 2006

(86) PCT No.: PCT/EP2006/007306
§ 371 (c)(1),
(2), (4) Date: Jan. 23, 2008

(87) PCT Pub. No.: WO2007/012455
PCT Pub. Date: Feb. 1, 2007

(65) Prior Publication Data
US 2009/0146670 A1    Jun. 11, 2009

(30) Foreign Application Priority Data
Jul. 27, 2005  (DE) .................. 10 2005 035 045

(51) Int. Cl.
*G01F 23/00* (2006.01)

(52) U.S. Cl. ..................................... 73/304 R

(58) Field of Classification Search ............... 73/290 R
See application file for complete search history.

(56) References Cited

FOREIGN PATENT DOCUMENTS

| | | |
|---|---|---|
| DE | 1798256 | 1/1972 |
| DE | 30 18 718 A1 | 12/1981 |
| DE | 35 28 624 A1 | 2/1986 |
| DE | 40 42 257 A1 | 7/1992 |
| DE | 197 26 044 A1 | 2/1999 |
| EP | 0 152 644 A2 | 8/1985 |
| EP | 1 125 748 A1 | 8/2001 |
| EP | 1 484 097 A1 | 12/2004 |
| GB | 1288 177 | 9/1972 |
| JP | 08050047 A | 2/1996 |
| JP | 2004077439 A | 3/2004 |
| WO | WO 01/74719 A1 | 10/2001 |

*Primary Examiner* — Hezron Williams
*Assistant Examiner* — Alex Devito
(74) *Attorney, Agent, or Firm* — Hudak, Shunk & Farine Co. LPA

(57) ABSTRACT

A measuring device for determining flow capacities $d(V(z))$ of electroconductive liquids having a conductivity LF through a container in the event of vertically (z direction) variable levels. The inventive measuring device is a conductivity measuring device comprising, inter alia, at least two electrodes extending in the z direction. The container and/or the conductivity measuring device is/are embodied in such a way that they can be described by at least one parameter function $f_{P_i}(V(z))$ dependent on $V(z)$. At least one of said parameter functions must have an exponential dependence on $V(z)$. A measuring element and a method for determining the total flow capacity $d(V)$.

25 Claims, 10 Drawing Sheets

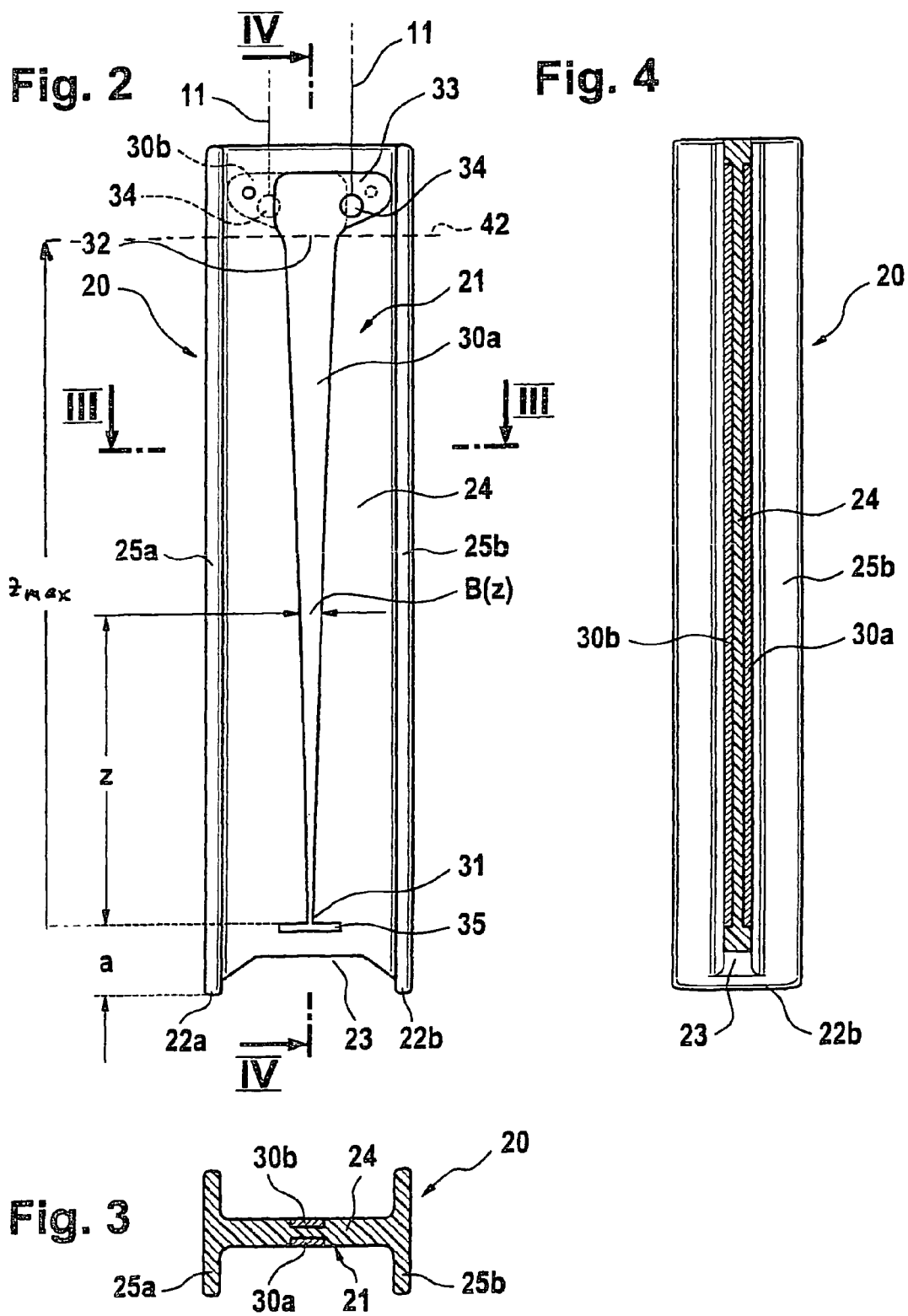

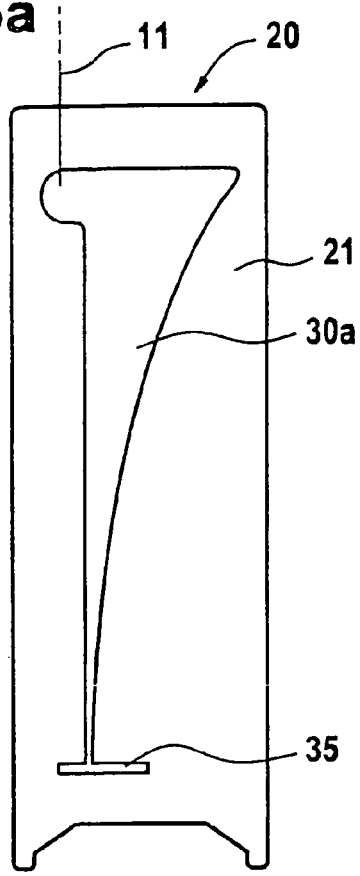
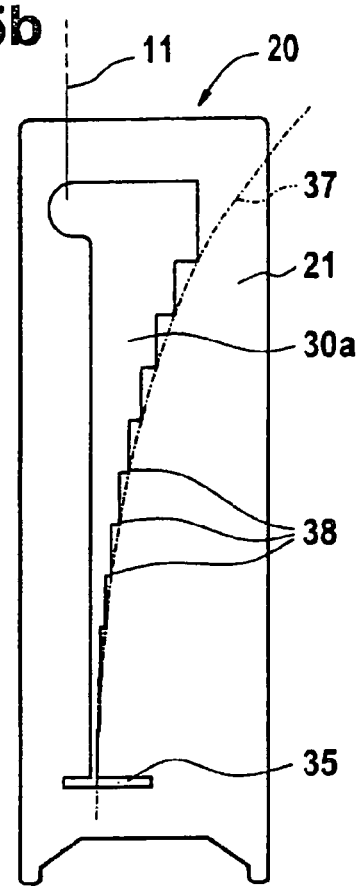
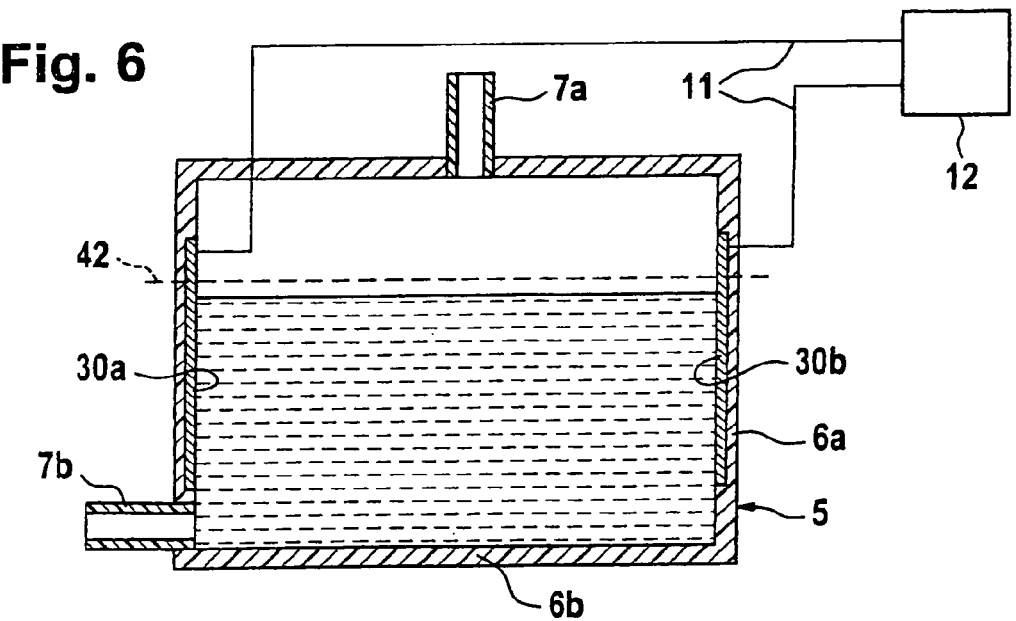

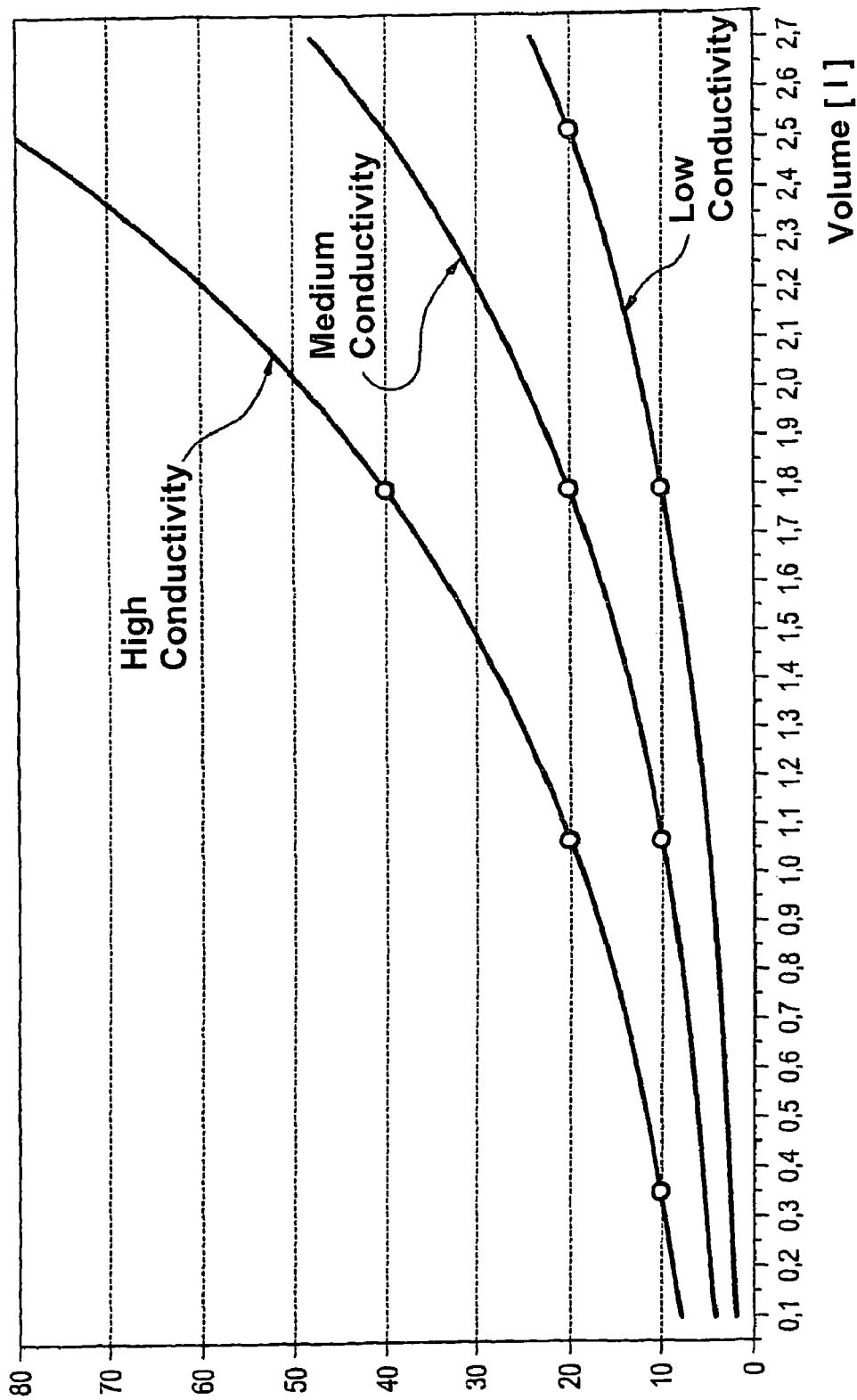

MEASURING DEVICE, AND CONDUCTIVITY MEASURING DEVICE, FOR DETERMINING FLOW CAPACITIES OF ELECTROCONDUCTIVE LIQUIDS, MEASURING ELEMENT, AND METHOD

FIELD OF INVENTION

The invention relates to a measuring device for determination of flow amounts, dV(z), of electrically conducting liquids having conductivity LF, for flow through a container in which the liquid level varies in the vertical direction (z-direction), which device is comprised of: a container having: a bottom wall, a liquid inlet, and a liquid outlet; and a conductivity measuring device comprised of the following components: a voltage source; an evaluation device; and at least one measuring element which: is disposed in the container and is connected to the evaluation device; and has at least two electrodes which extend in the z-direction, which electrodes are disposed a distance apart in a direction perpendicular to the z-direction, wherewith $Z_{max}$ represents the distance from the first end (lower end) of the electrode (at z=0) to the second end (upper end) of the electrode.

The invention also relates to a conductivity measuring device for determination of flow amounts, dV(z), of electrically conducting liquids for situations in which the liquid level varies in the vertical direction (z-direction); a measuring element having at least one elongated electrode, for determining a measurement value from electrically conducting liquids, which measurement value depends on a liquid level; and a method of determining the overall amount, dV, of flow, of electrically conducting liquids of conductivity LF, through a container in which the liquid level varies in the vertical direction (z-direction), which method employs a container and device for measuring conductivity.

BACKGROUND OF THE INVENTION

It is generally sought to measure liquid levels in situations where one seeks to determine liquid volumes or changes in liquid volumes. The customary means of measuring liquid levels comprise electrodes which are partially immersed in the liquid. Suitable measurement systems are employed to measure the resistance and/or electrical conductivity of the liquid, which measurement is proportional to (inter alia) the liquid level (or liquid volume).

In this connection, the physical relationship $LF = \delta_0 \cdot ZK \cdot V$ is utilized, where LF is the electrical conductivity of the liquid, $\delta_0$ is the specific conductivity of the liquid, V is the volume of the liquid, and ZK is the so-called "cell constant", which can be calculated from the ratio of the electrode distance and the wetted electrode surface area.

The specific conductivity $\delta_0$ influences the slope of the measurement curve (measured value as a function of liquid level); thus, prior to measurement of the liquid level one must perform a calibration measurement to determine this specific conductivity. Such calibration requires additional expense of resources, which one would like to avoid or minimize.

DE 197 26 044 A1 discloses a liquid level indicator, particularly for plant containers, which is comprised of an elongated rod with at least two mutually insulated electrodes and an electronic circuit connected to the electrodes via connecting lines disposed in said rod, wherewith the indicator is powered by a D.C. voltage source. The liquid level is indicated on a display device. This liquid level indicator system requires a plurality of electrodes which are disposed at different altitudes (elevations). Each electrode is connected to the electronic circuit by a separate connecting line. This system is quite costly to realize.

DE 40 42 257 discloses a method and device for determining the liquid levels of electrically conducting liquids. This is achieved via, e.g., a chain (series) of resistances which extend vertically into the liquid. From a measurement of the overall resistance of the system one can determine how many of the resistances are disposed above the liquid level, and what the height ("depth") of the liquid level is; this is facilitated by the fact that the metal surfaces are applied along the surface in a close and constant mutual separation. This system too is costly, and delivers only discrete values of the liquid level.

DE 30 18 718 discloses an electrode device for determining liquid levels, which device also employs a plurality of liquid-level-determining electrodes, which are disposed on a support and are continuously displaceable in the longitudinal direction of the support.

JP 08050047 A discloses an electrode device having a plurality of electrodes, for measuring the electrical resistance of the liquid in order to determine the liquid level.

JP 2004077439 A discloses a measuring electrode for determining the liquid level, which electrode has a conical or hemispherical shape. The lower region of the electrode has a small diameter, and the upper end has a large diameter.

Liquid level measurements are also made in water filter devices, to aid in determining when the filter medium in a filter cartridge has become exhausted (is due for replacement). Such an exhaustion indicating device is disclosed in, e.g., EP 1 484 097 A1. This device is based on measurements of resistance of the liquid using two electrodes which are disposed one over the other in a water container or are disposed in a feed channel. A drawback of this device is that each time the water quality changes one must make additional calibration measurements.

Another exhaustion indicating device is disclosed in WO 01/74719; this device employs a plurality of electrodes which extend into the liquid. In or on the water filter device, an evaluation unit is disposed which determines the measured fill volume over a specified time interval, which evaluation unit is connected to a display unit, the so-called "exhaustion indicating device". In such water filter devices, raw water is introduced into the feed funnel, and then passes downward through the filter cartridge, and leaves the cartridge on the underside thereof, and the filtered water is collected in a lower chamber of the device. With raw water being fed from time to time, and being drawn down, the liquid level varies numerous times during the service life of the cartridge; and the history of the liquid level enables one to determine the amount of liquid which has passed through the filter cartridge. Thus supplied with data on the amount of liquid which has been passed, the exhaustion indicating device can then present information as to the degree of exhaustion of the filter medium.

SUMMARY OF THE INVENTION

Accordingly, it was an underlying problem of the invention to devise a measuring device which has a simple structure and does not require calibration measurements concerning the specific conductivity of the liquid. It was a further underlying problem of the invention to devise: a measuring element which has a simple structure and is easy to handle; a conductivity measuring device; and a measurement method.

The problem is solved with a measuring device which is characterized in that, at time intervals $t_i - t_{i-1}$ (for $i = 1 \ldots n$), the conductivity measuring device delivers measurement values $M_{t_i}(V) = M(V(z)) \sim LF \cdot f_M(V(z))$;

further in that at least the container (5) and/or the conductivity measuring device is/are configured such that it/they is/are describable by at least one parameter function dependent on V(z), $$f_{P_I}(V(z)) \text{ (for } I=1\ldots m),$$

so that the following applies:

$$f_M(V(z)) \sim f(f_{P_I}(V(z)) \text{ for } I=1\ldots m) \sim b_M^{V(z)},$$

where $b_M$ is a number which is not equal to zero or 1;
further in that the evaluation device is configured at least so as to be able to deliver quotients of the measured values and to obtain logarithms of the quotients, where the ~ denotes a proportional relationship throughout the remainder of the specification.

The z-direction is chosen to be perpendicular to the liquid level in the liquid container. The exponent can have a positive or negative sign.

The aforesaid problem can also be solved with a conductivity measuring device which is characterized in that, at time intervals $t_i - t_{i-1}$ (for $i=1\ldots n$), the conductivity measuring device delivers measurement values $M_{t_i}(V) = M(V(z)) \sim LF \cdot f_M(V(z))$ further in that the conductivity measuring device is configured such that it is describable by at least one parameter function dependent on V(z), $$f_{P_I}(V(z)) \text{ (for } I=1\ldots m),$$

so that the following applies:

$$f_M(V(z)) \sim f(f_{P_I}(V(z)) \text{ (for } I=1\ldots m)) \sim b_M^{V(z)},$$

where $b_M$ is a number which is not equal to zero or 1; and in that the evaluation device is configured at least so as to be able to deliver quotients of the measured values and to obtain logarithms of the quotients.

The invention arises out of recognition of the fact that one does not actually need to know either the conductivity of the liquid or the absolute value of the height of the liquid level, in order to determine the flow amounts of electrically conducting liquids through a container, provided that the measurement device is designed such that there is an exponential relationship between the measured value $M_{t_i}(V(z))$ and the volume of liquid V(z) in the container.

It has been found that various configurations may serve as satisfactorily solutions to the stated problem, in this respect, whereby in general the configurations allow the use of the appropriate parameter functions.

A parameter function, $f_{P_I}$ (where I is a running index, giving rise to $f_{P_1}$, $f_{P_2}$, etc.) is understood to be a configurational (structural) parameter which has a functional dependence on V(z) and therefore on z. Examples of possible such parameters $P_I$ are z-dependent quantities such as: the container shape, the electrode shape, the distance between the electrodes, and properties of the electrode material. The variable comprising the distance between electrodes may consist of a general separation of two electrodes, or a separation which is effective as to the electric field lines. In the latter case, the two electrodes may be disposed close together, and an impeding structure may be disposed between them, which structure changes the path lengths of the electric field lines.

According to a particular embodiment, at least one element is disposed between the two electrodes, which element changes the path lengths of the electric field lines which form between the two electrodes. This path-changing element may be a component of the support element which bears the two electrodes, or may be an additional element disposed on the support element. It is important that the path-changing element is configured (shaped or etc.) such that the path lengths of the field lines change exponentially with increasing z.

Preferably, the path-changing element is configured such that the path lengths of the field lines decrease with increasing z.

According to a preferred embodiment, the path-changing element is a plate having a curved free forward edge.

The two electrodes can be disposed side by side on a support element, and the path-changing plate may be disposed between the two electrodes.

According to another embodiment, the electrodes are disposed on opposite sides of a support element, and each electrode has a respective path-changing plate disposed laterally of and close to it, which plate changes the path lengths of the field lines between the electrodes.

Preferably, the path-changing plate may be disposed perpendicularly to the support element. The particular configuration of this impeding plate depends on the configuration of the support element and on the disposition of the electrodes on the support element. In this connection, therefore, it is preferred, in a case where the electrodes are disposed oppositely on a support element, that the plates are disposed parallelly to the support element.

If, as pertains according to the state of the art, all of the parameters $P_I$ have a linear dependence, e.g. if: the container is cylindrical, the distance between the electrodes is chosen to be constant, the areas of the electrodes are constant, and the electrode material is chosen to be uniform over the entire height (length); then, one must know the value of the conductivity of the liquid, and one must know the absolute liquid levels, in order to determine the flow amounts.

It has been found that if at least one parameter function, $f_{P_I}$ has an exponential dependence, then one no longer requires knowledge of the conductivity of the liquid or the absolute liquid level.

In general form, one may construct a matrix for, e.g., four parameter functions, which matrix illustrates the relationships, as appears infra. Here "arbitrary" is understood to mean any functional relationship which does not destroy the exponential relationship of another parameter function; in particular, a logarithmic function is excluded as such an "arbitrary" function.

| Measured value, M(V(z)) | $f_{P_1}$ | $f_{P_2}$ | $f_{P_3}$ | $f_{P_4}$ |
|---|---|---|---|---|
| Exponential | Exponential | Arbitrary | Arbitrary | Arbitrary |
| Exponential | Arbitrary | Exponential | Arbitrary | Arbitrary |
| Exponential | Arbitrary | Arbitrary | Exponential | Arbitrary |
| Exponential | Arbitrary | Arbitrary | Arbitrary | Exponential |

It is possible for more than one of the parameter functions $f_{P_I}$ to have an exponential or partially exponential dependence. The constraint applied in this connection is that one must ensure that M(V(z)) depends exponentially on V(z) and on z.

The advantage of an exponential relationship lies in that when the volume of the liquid held increases by a given amount, the measured value, $M_{t_i}(V(z)) \sim b_M^{V(z)}$, changes by the same factor, with the consequence that the given conductivity of the liquid, and the two liquid levels defining the volume change (the two liquid levels between which the volume change occurred), do not influence the result.

Therefore, according to a particular embodiment it is provided that, for at least one parameter function, the following applies:

$$f_{P_I}(V(z)) \sim b_{P_I}^{V(z)}.$$

The basis value, $b_{P_I}$, should be chosen such that even small changes in the volume of liquid give rise to significant changes in the measured value. The choice of $b_{P_I}$ will depend on the unit of measure of z. Herein, all references to z assume units of centimeters (cm), even if not expressly stated. Likewise, all areas are assumed to be stated in cm², and all volumes in cm³.

It is preferred to choose $b_{P_I}$ in the range $0 < b_{P_I} \leq 5$, particularly $1 < b_{P_I} \leq 1.5$, with $b_{P_I} \neq 1$.

According to a preferred embodiment, the parameter $P_I$ is the area of at least one electrode. A(V(z)) is the area of conductive electrode surface wetted with the liquid, which electrode surface changes with increasing or decreasing volume, according to the particular structural configuration of it. For the area A, the following applies:

$$A(V(z)) = f_{P_I}(V(z)) \sim b_{A_I}^{V(z)}.$$

In this instance, the other parameter functions, such as, e.g., those which describe the shape of the container, may have a linear dependence. Thus the liquid container may have a cylindrical, cubic, or rectangular prism shape.

According to another embodiment, the parameter $P_I$ is the container shape F which determines the liquid volume (fill volume), for which the following applies:

$$F(V(z)) = f_{P_I}(V(z)) \sim b_F^{V(z)}.$$

Preferably, the F(V(z)) reduces to a function of the cross section, Q(z), wherewith $$F(V(z)) = \int_o^z Q(z)\,dz$$

For example, in a liquid container with a relatively small cross sectional area, small changes in volume will lead to appreciable changes in the liquid level, so that $b_F$ may be chosen with a small value, e.g. in the range below 2.5.

In a container with a relatively large cross sectional area, the relationships are correspondingly different. In order to achieve a suitable precision of measurement in the case of a corresponding change in volume, $b_F$ must be chosen with a higher value, e.g. in the range above 2.5.

If the function F(V(z)) is exponential, then, e.g., the electrode surface areas may vary linearly with z; thus, e.g., the electrodes may have a constant width over their entire extent in the z-direction.

According to yet another embodiment, the parameter $P_I$ may be the distance D between the electrodes, for which the following applies:

$$D(V(z)) = f_{P_I}(V(z)) \sim b_D^{-V(z)}.$$

In this case, the parameter functions relating to parameters which determine the liquid volume (fill volume), e.g. the container shape F(V(z)) and/or the surface area of the electrode A(V(z)) and/or other parameter functions, may have, e.g., a linear form.

An exponential relationship may also be provided by the material of the electrodes, wherewith the properties of the material, such as the conductivity of the electrode material, may vary exponentially with respect to z.

Preferably, the measuring element has a support plate, with the two electrodes being disposed on opposite sides of the support plate. The electrodes are pre-positioned during the fabrication of the measuring element, which facilitates installation of the measuring element in the liquid container. It is unnecessary to adjust the two electrodes in order to obtain a predetermined parameter value of the measuring cell.

Preferably, the measuring element is disposed in the liquid container in a manner such that the second end (wide end) of the electrode is at the top. This provides a rising curve of the measurement value as the liquid volume (fill volume) increases.

According to a particular embodiment, the measuring element may be integrated into the wall of the liquid container. In this case, it is preferable if the two electrodes are disposed a distance apart on/in the wall of the liquid container, or if the electrodes are disposed at opposite positions.

According to another particular embodiment, the liquid container is a feed funnel of a water filter device. As a rule, with such feed funnels the liquid is introduced from above. The liquid outlet opening is disposed in the bottom wall of the feed funnel, where a filter element, e.g. a filter cartridge, is disposed. The flow amount can be determined in a specialized utilization of the measuring device to determine the point when the filter cartridge is due for replacement, thus to measure the volumetric "load" which the filter cartridge has experienced.

The evaluation device may be connected to a display unit. In the case of use of the measuring device as a device for measuring the volumetric load on a filter cartridge, this display unit may be an indicator which indicates to the user when it is time to replace the cartridge.

Preferably, at least the voltage source, the evaluation device, and the at least one measuring element are integrated into a module or subassembly. According to another embodiment, the display unit may also be integrated into said module. In the case of an external voltage source, preferably the evaluation device and the at least one measuring element are integrated into the module. These embodiments enable easy operation and handling of the device, and rapid replacement, because the device is unitarily mounted in the container in which the flow amount measurements are to be performed.

The inventive measuring element for determining a measurement value of electrically conducting liquids, which value is dependent on the liquid level, which element comprises at least one elongated electrode, is configured such that the area A of the electrode increases exponentially with increasing distance z from the first end to the second end of the electrode. Let B(z) represent the width of the electrode as a function of z. Then $$A(V(z)) \sim b_{A_1}^{V(z)}, \text{ and}$$

$$A(z) \sim \int_o^z B(z)\,dz$$

Consequently, B(z) is an exponential function:

$$A(V(z)) \sim A(z) \approx B(z) \sim b_{A_2}^{z}.$$

Preferably, $0 < b_{A_2} \leq 5$, and $b_{A_2} \neq 1$; and particularly preferably $1 < b_{A_2} \leq 1.5$. These ranges apply for the case in which z is dimensioned in cm. For z in other units, the basis $b_{A_2}$ will need to be changed accordingly.

Preferably, the broadening of the electrode is continuous. However, according to an alternate embodiment, the width of the electrode may change stepwise, with the envelope of the steps having the described exponential dependence. This embodiment leads to corresponding steps in the measurement curve; the evaluation device connected to the measuring element can be configured appropriately, to provide determinations of the absolute liquid level.

Preferably, the width $B_1$ at the first end of the electrode is in the range 0.1-20 mm; and the width $B_2$ at the second end of the electrode is in the range 5-30 mm.

At the first end of the electrode, a bar-like widened region is provided which extends perpendicularly to the axis of the electrode. This bar-like widened region serves to provide a defined initial measurement value.

A contact element is provided at one of the ends of the electrode. Preferably, the contact element is mounted on the upper end of the electrode, and thus is not contacted by the liquid.

The electrode may be comprised of a metal, a metal alloy, an electrically conducting plastic, or another electrically conducting material.

In order to facilitate handling of the electrode(s), at least one electrode is disposed on a support element.

The measuring element may be integrated into the wall of a liquid container. In this case, the wall of the liquid container forms the support element.

If the support element is an independent component, preferably it is in the form of a plate; an electrode may be mounted on each of the two opposite sides of the plate. The electric field between the two electrodes will then extend around the support element.

Preferably, the two electrodes are identically configured.

Preferably, the support plate has a double-T cross section (I-beam cross section), which has the advantage of greater stability, and thus resistance to damage of the electrode in the case of mechanical stressing of the measuring element.

Preferably, the support plate has two feet disposed close to the first end of the electrode; these serve to provide a defined distance to the bottom of the liquid container. As a result, an initial electric field is established which extends under the measuring element. When the liquid level in the container is low, the said initial electric field will still be inside the column of liquid.

Advantageously, both the electrodes and the support plate are comprised of plastic material, with an electrically conducting plastic being selected for the electrodes, and a non-conducting plastic for the support plate.

Accordingly, the measuring element may be economically fabricated as a two-component injection-molded piece.

The method of determining the overall amount of flow of electrically conducting liquids of conductivity LF, through a container in which the liquid level varies in the vertical direction (z-direction), which method employs a container and a device for measuring conductivity, is characterized by the following steps:

configuring at least the container and/or the conductivity measuring device such that it/they is/are describable by at least one parameter function dependent on V(z), $f_{P_I}(V(z))$ (for $I=1 \ldots m$);

devising or adapting the at least one parameter function, $f_{P_I}(V(z))$, such that for the measurement values delivered by the conductivity measuring device:

$M(V(z)) \sim LF \cdot f_M(V(z)) \sim f(f_{P_I}(V(z))) \sim b_M{}^{V(z)}$;

carrying out a measurement to determine the basis, $b_M$;
determining measured values $M_{t_i}(V(z))$ at time intervals $t_i - t_{i-1}$ (for $i=1 \ldots n$);

determining quotients $M_{t_{i+1}}/M_{t_i}$, and determining of the logarithms of such quotients, in order to determine $dV_i$; and adding together the n-fold of values $dV_i$, to determine the overall amount, dV, which has flowed through.

As a rule, only one initial measurement need be taken in order to determine the basis $b_M$ for a given system; predetermined amounts of liquid are used in connection with this, and it is performed prior to the determination of the regular measurement values. Thus one begins with the one value of $b_M$ and uses it in calculating the measurement values. The value of $b_M$ is used in taking the logarithms of the quotients, in calculating the values of $dV_i$.

Preferably, during the operation of the apparatus in which the measuring device is installed, the measurement values $M_{t_i}$ are determined at time intervals of 1-100 seconds.

The choice of a time interval depends on, inter alia, the frequency of use and the speed of the flow through the given apparatus. If the apparatus is a water filter device, a major factor is how much filtered water the user requires. Preferred time intervals are 1-20 sec, particularly preferably 2-10 sec.

BRIEF DESCRIPTION OF THE DRAWINGS

Advantageous embodiments of the invention will be described in more detail hereinbelow, with reference to the accompanying drawings.

FIG. 2 is an elevation view of a measuring element according to a first embodiment;

FIG. 3 is a horizontal cross section through the measuring element shown in FIG. 2, through line III-III;

FIG. 4 is a vertical cross section through the measuring element shown in FIG. 2, through line IV-IV;

FIGS. 5a and 5b are elevation views of measuring elements according to two additional embodiments;

FIG. 6 is a liquid container having integrated electrodes;

FIG. 10 is a diagram presenting examples of plots of the measured value as a function of volume, for three liquids having different conductivities;

DETAILED DESCRIPTION OF THE INVENTION

Figure 1:
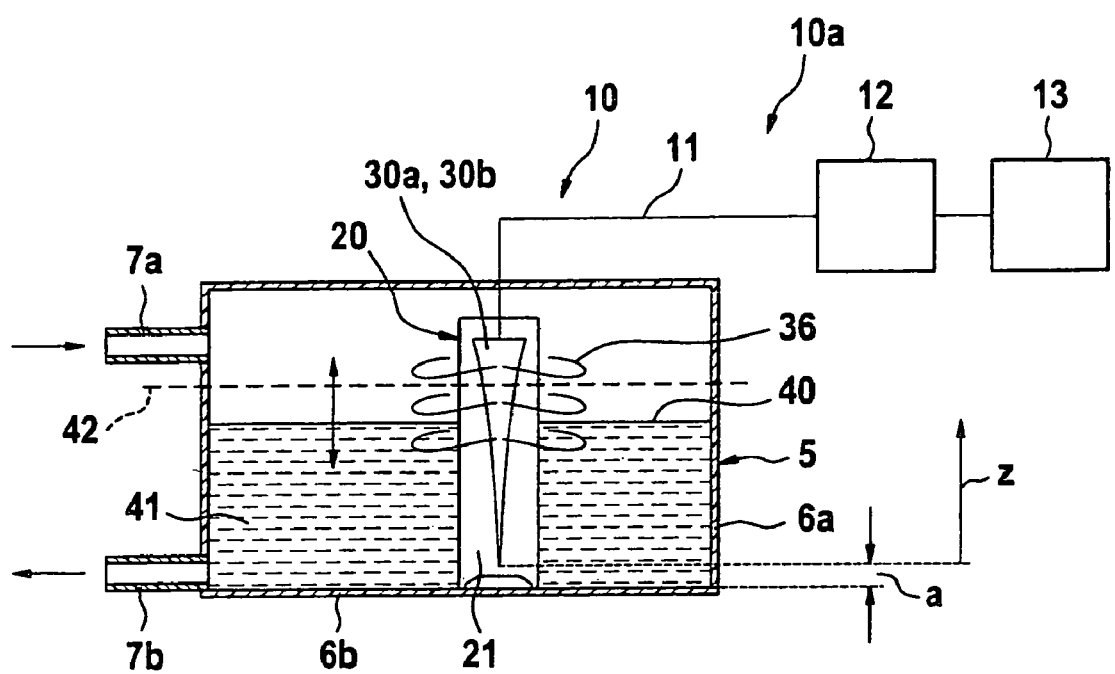
FIG. 1 is a schematic representation of a first embodiment of a measuring device.

FIG. 1 shows schematically a first embodiment of a measuring device 10, which device is comprised of a conductivity measuring device 10a comprising a measuring element 20 disposed in the interior of a liquid container 5. The container 5 has a peripheral wall 6a and a bottom wall 6b; a liquid inlet 7a is disposed in the upper region of the peripheral wall 6a, and a liquid outlet 7b is disposed in the lower region of the peripheral wall 6b. The inlet flow rate and outlet flow rate vary over time, and accordingly the (altitude of the) liquid surface level 40 of the liquid 41 in the container 5 may vary continuously (as represented by the double arrow). The measuring device 10 is provided for the purpose of measuring the amount of liquid flowing through the container 5.

The measuring element 20 of the measuring device 10 has a support plate 21 which has a front electrode 30a and a rear electrode 30b, on its front and rear face, respectively. In disposing the support plate 21 bearing the electrodes (30a, 30b), one needs to ensure that when the container is completely filled the electrode is not completely immersed and the electrical connections are not at all contacted by the liquid. The maximum permissible liquid level is indicated by the dashed line 42. In FIG. 1, only the front electrode 30a is visible. The rear electrode 30b (which is not visible) is identically configured on the rear side of the measuring element. The electrodes (30a, 30b) each have a width which increases with progression upward, in an exponential function of the distance from the lower end (first end) 31 of the electrode. The functional relationship between A(V(z)) and z is essentially given by $A(V(z)) \sim b_{A_1}^{V(z)}$, resulting in an exponential widening of the electrodes, namely $A(V(z)) \sim b_{A_2}^{z}$, or for the width $B(z) \sim b_{A_2}^{z}$. The z-axis is indicated in the right part of FIG. 1, with the zero point of the z-axis being at the lower end 31 of the electrodes (30a, 30b). The distance a of the lower end of the respective electrode (30a, 30b) from the bottom wall is indicated.

In the evaluations, the volume of liquid in this region is taken into account as a constant (fixed number).

The two electrodes (30a, 30b) are connected via a communication line 11 to an evaluation device 12 which is connected to a display unit 13. Advantageously, all of the components of the conductivity measuring device are disposed in a single module (subassembly), preferably in a single housing (e.g. see the configuration in FIG. 14). This facilitates equipping the container 5. One need only mount the conductivity measuring device 10a in the container, thus making setup quite easy.

The measuring device 10 is used to measure the conductivity of the liquid 41; the measurement and evaluation may be performed continuously or discontinuously. The electric field lines between the two electrodes (30a, 30b) are illustrated and indicated by the reference numeral 36.

FIG. 2 is an enlarged elevation view of the measuring element 20. The measuring element 20 is comprised of a support plate 21 and two measuring electrodes (30a, 30b). The support plate 21 (FIG. 3) is comprised of a central web member 24 connecting two flanges (25a, 25b), resulting in a double-T shaped (I-beam) cross section of the support plate 21. The web plate 24 has a recess 23 at its lower end, wherewith the T-flanges are elongated downward and form feet (22a, 22b).

Identical electrodes (30a, 30b) are disposed on the two sides of the web member 24, which electrodes are symmetrical all the way up to a widened region on the upper end. Each such electrode (30a, 30b) has a narrow first electrode end 31 and a wide second electrode end 32; the first end 31 of the electrode is disposed at the bottom, and the second end 32 of the electrode is disposed in the region of the maximum permissible liquid level 42. In this connection, the situation of the installed condition in the liquid container 5 of FIG. 1 is indicated in FIG. 2.

The width B of the electrode 30a increases continuously with increasing distance z, from the first electrode end 31 to the second electrode. The distance from the first (lower) end of the electrode, 31, to the second (upper) end of the electrode, 32, is designated $Z_{max}$. For the width B, the following proportionality relationship applies: $B(z) \sim b_{A_2}^{z}$.

At the first electrode end 31, the electrode 30a has a bar-like widened region 35 which extends perpendicularly to the longitudinal axis of the electrode, which widened region serves to define the magnitude of the starting measured value. The same is true for electrode 30b.

The second electrode end 32 has a contact element 33 adjoining it, which contact element bears a contact fitting (contact pill) comprised of, e.g., silicone with graphite. The contact element 33 is adjusted to the size of the contact pill 34, and projects laterally beyond the sides of the electrode proper. The contact pill 34 serves as a connecting element for the electrical connecting line 11 which leads to the evaluation device 12 (FIG. 1).

FIG. 3 is a cross section along line III-III through the measuring element 20 shown in FIG. 2. It is seen that the electrodes (30a, 30b) are disposed respectively on both sides of the web member 24.

FIG. 4 is a vertical cross section along line IV-IV through the measuring element shown in FIG. 2. The support plate 21 is comprised of nonconducting plastic material, whereas the electrodes (30a, 30b) are comprised of conducting material. This allows the measuring element 20 to be fabricated as a two-component injection-molded piece.

FIG. 5a illustrates a different embodiment of the measuring element 20, which differs from that according to FIG. 2 in that each of the electrodes (30a, 30b) is asymmetric (30b, being on the reverse face, is not shown), having a straight boundary line and a curved boundary line, the curved boundary line describing an exponential function.

FIG. 5b illustrates a variant in which the electrode 30a has a stepped configuration. The envelope curve 37 of the individual steps 38 corresponds to the right-side boundary line of the electrode 30a in FIG. 5a, and also describes an exponential function.

FIG. 6 shows a second embodiment of the measuring device 10, which differs from the embodiment according to FIG. 1 in that the electrodes (30a, 30b) are disposed on opposite wall elements of the liquid container 5, and in that the liquid inlet 7a is not disposed in the peripheral wall but in the covering wall. In this embodiment, the function of the support plate 21 in the above-described embodiments is carried out by the peripheral wall 6a. The maximum permissible liquid level 42 is chosen such that the contact elements 33 of the electrodes (where the connections are provided) are not contacted by the liquid.

Figure 7:
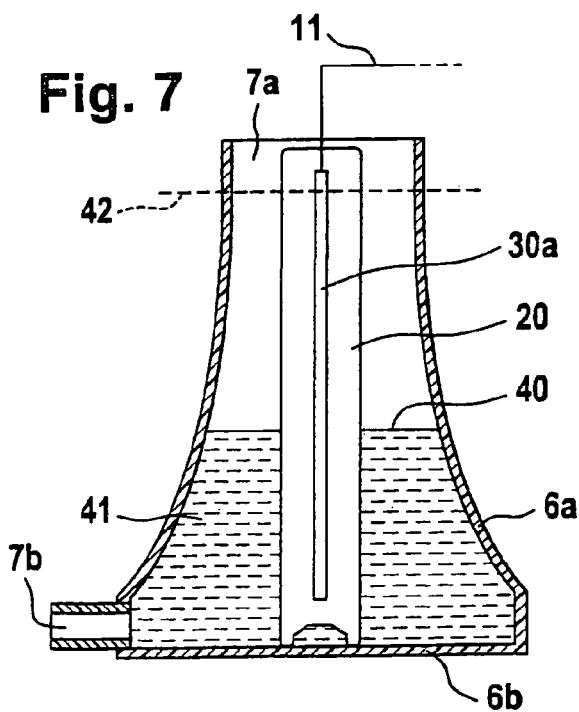
FIG. 7 is a schematic representation of a measuring device according to a second embodiment.

FIG. 7 illustrates another (a third) embodiment of the measuring device 10. In contrast to the rectangular shape of the liquid container according to FIG. 1, such that the function F(V(z)) describes a straight line, the liquid container 5 according to FIG. 7 narrows with progression upward. The lateral wall 6a is curved and describes an exponential function, so that the function F(z) which describes the boundaries (cross section) of the liquid container 5 is also an exponential function. The following proportionality relationship applies: $F(V(z)) \sim F(z) \sim b_F - z$. In this case, the measuring element 20 may have electrodes (30a, 30b) which have a constant width with progression in the z-direction.

Figure 8:
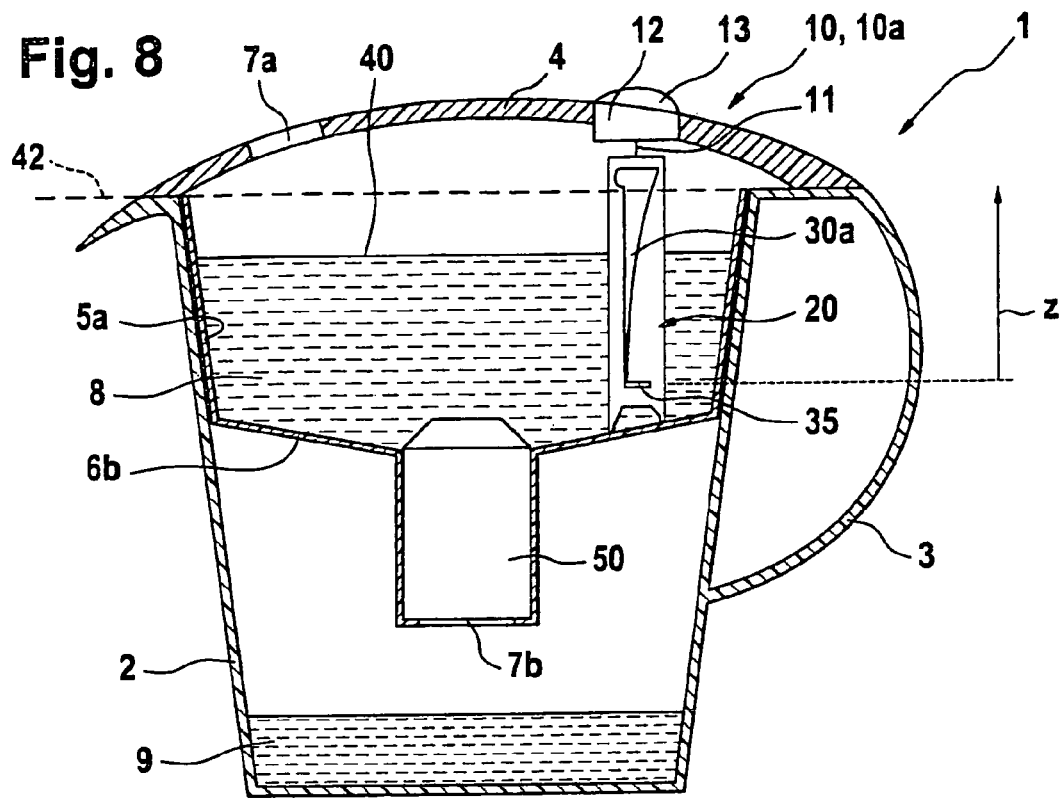
FIG. 8 is a vertical cross section through a water filter apparatus having a measuring device.

FIG. 8 is a vertical cross sectional view of a water filter apparatus 1 which has a pitcher-like container 2 with a handle 3 and cover 4, and a feed funnel 5a disposed in the container 2. A filter cartridge 50 has been disposed in the outlet 7b of the feed funnel 5a. The raw water 8 is introduced into the feed funnel 5a after lifting of the cover 4, or through the inlet opening 7a in the cover 4; and water flows from the feed funnel through the filter cartridge 50 and into the container 2, where the filtered water 9 collects at the bottom.

Figure 14:
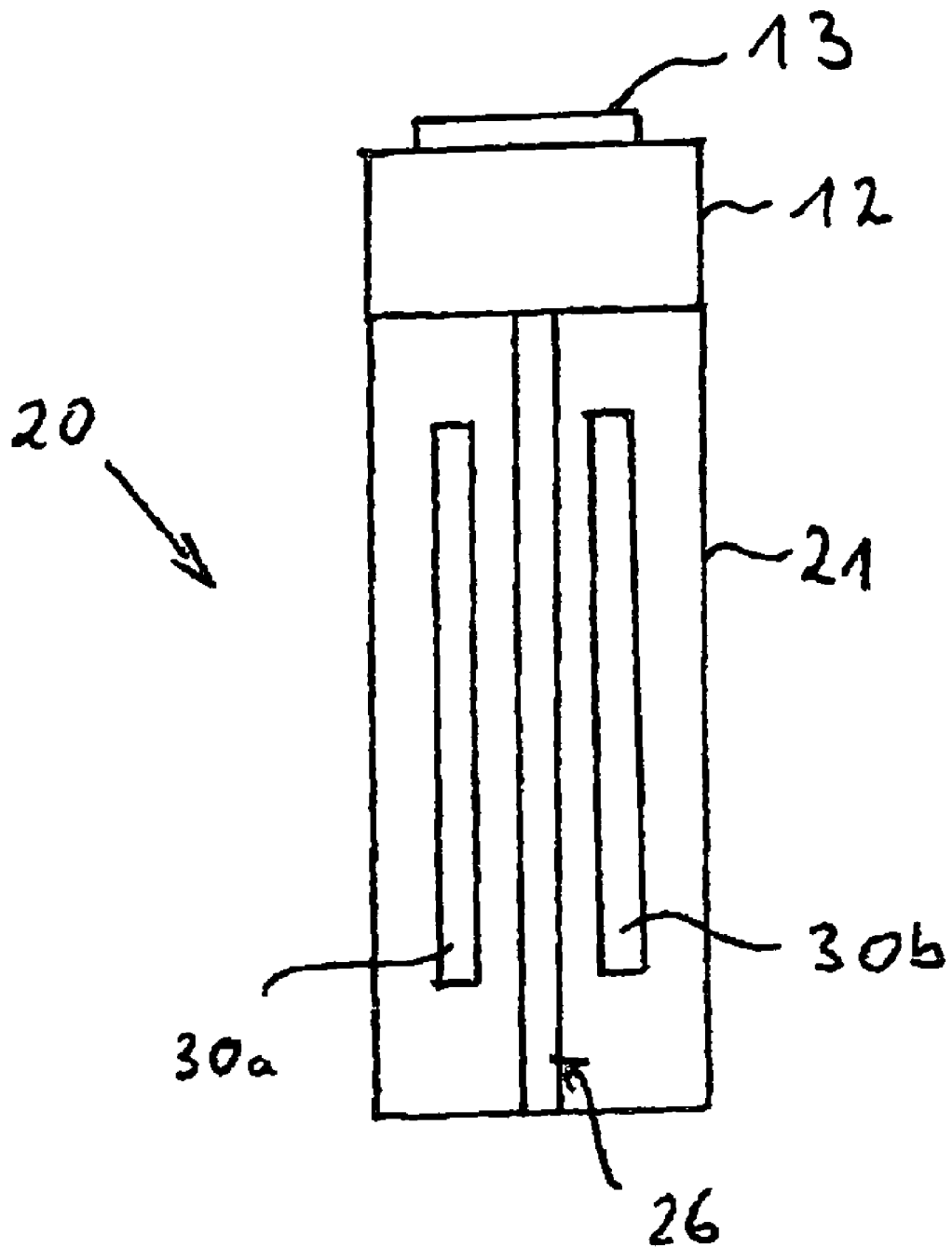
FIG. 14 is a conductivity measuring device in the form of an integral structural subassembly.

The conductivity measuring device 10a is disposed in the feed funnel 5a; the device 10a has a measuring element 20 which is connected to an evaluation device 12 via an electrical line 11. The evaluation device 12 contains its own electric current supply. The evaluation device 12 bears a display unit 13 which is disposed in the cover 4 and is visible from the surroundings. The conductivity measuring device 10a may also be in the form of a module or subassembly, as illustrated in FIG. 14. This module may be installed in, e.g., the cover or the container.

As raw water 8 is introduced, the liquid level 40 rises. During the filtration, the liquid level 40 decreases.

From differences in the degree of fill, one can determine the volumes of liquid which have flown through the filter cartridge 50. This volume is a parameter from which the decision of when to change the filter cartridge 50 is made.

The changes in the liquid level 40 are determined by the measuring element 20. From the measured values, the evaluation device 12 calculates the corresponding volumes, based on the dimensions of the feed funnel 5a. When the prescribed volume for the given filter cartridge 50 is exceeded, this fact is communicated to the user, via the display 13. Thus, in this embodiment the measuring device 10 is employed as a means of measuring the volumetric load on the filter cartridge 50.

Figure 9:
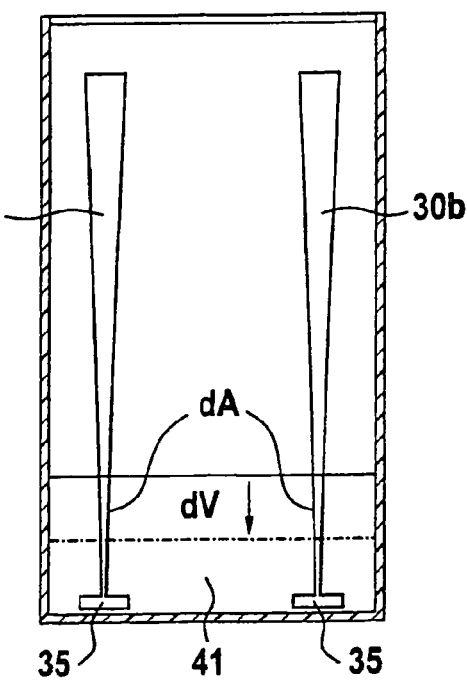
FIG. 9 is a schematic representation of the measurement principle.

FIG. 9 illustrates the principle of the arrangement of the electrodes (30a, 30b). dV is the change in volume of the liquid when the liquid level 40 is changed. The described measuring device 10 was employed to make conductivity measurements for three liquids having different conductivities. The result is illustrated in FIG. 10.

The measured values $M_{t_i}$ are taken at prescribed time intervals: $\Delta t = t_i - t_{i-1}$. The following applies:

$$M(V(z)) = K(LF) \cdot f_M(V(z)) = K(LF) \cdot b_M^{V(z)}$$

and thus for two successive measured values:

$$M_1(V) = K(LF) \cdot b_M^{V_1}; \quad M_2(V) = K(LF) \cdot b_M^{V_2}$$

and for the ratio of the two measured values:

$$\frac{M_2}{M_1} = \frac{K(LF) \cdot b_M^{V_2}}{K(LF) \cdot b_m^{V_1}} = \frac{b_M^{V_2}}{b_M^{V_1}} = b_M^{(V_2 - V_1)}$$

Here:

$M_1$ is the measured value at $V_1$, i.e. at time $t_1$;
$M_2$ is the measured value at $V_2$, i.e. at time $t_2$;
$V_1$ is the absolute volume prior to a change in volume;
$V_2$ is the absolute volume after a change in volume;
$dV = V_1 - V_2$ (the differential volume);
$K$ = a proportionality factor, which depends on, inter alia, LF. Other parameters which have an influence on K are the cell constant, the volume constant, and the proportionality factor of the measurement amplifier;
$b_M$ = the basis number for the exponential function, which number is determined by the geometry of the conductivity measuring cell and the dimensions of the container (change in the measured value in relation to the change in volume).

By applying logarithms, one obtains:

$$dV = \text{Log}_{b_M}\left(\frac{M_2}{M_1}\right)$$

It may be seen from the formulae that the factor K is cancelled out. For each measuring apparatus and configuration, the basis number $b_M$ must be determined, but requires only a single calibration, whereupon it operates as a constant in the measurement process. Knowing the other quantities, one can readily determine the differential volume.

For the example according to FIG. 10, for the measured values $M_1 = 20$ and $M_2 = 10$, and basis number $b_M = 2.5937$, the following calculations result (with units of volume in liters and z in centimeters):

(A) Low conductivity: K=1.8181; $M_1$=20; $V_1$=2.516; $M_2$=10; $V_2$=1.789; dV=0.727.
(B) Medium conductivity: K=3.6363; $M_1$=20; $V_1$=1.789; $M_2$=10; $V_2$=1.061; dV=0.727.
(C) High conductivity: K=7.7272; $M_1$=20; $V_1$=1.061; $M_2$=10; $V_2$=0.334; dV=0.727.

The same volume change was measured in each case, independently of K and thus of the conductivity (LF) of the liquid.

The exponential measurement principle is well suited to the determination of the differential volume. The advantage is that factors such as, e.g., the absolute conductivity of the liquid do not affect the determination of the measured quantity, and that only two measurements are required for one differential volume.

Figure 11A:
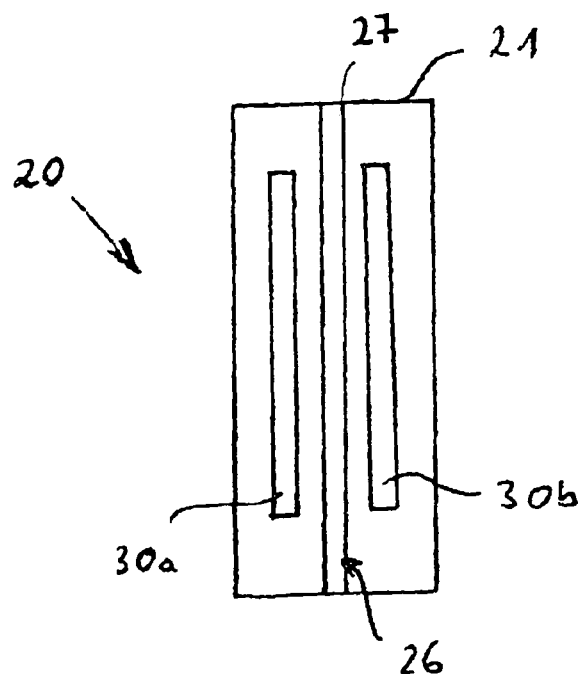
FIGS. 11a and 11b are two lateral views of a measuring element according to yet another embodiment.
Figure 11B:
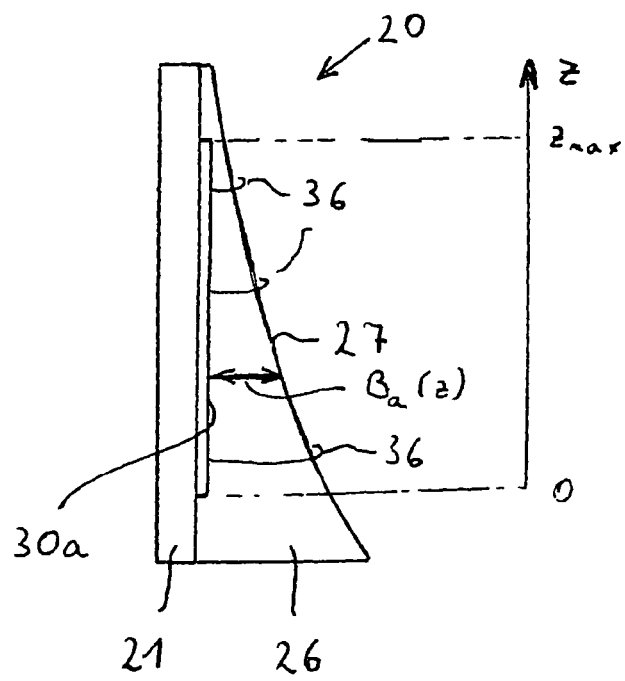

FIGS. 11a and 11b illustrate two lateral views of a measuring element 20 according to yet another embodiment. The two strip-like electrodes (30a, 30b) have a constant width, and are mounted side by side on a support plate 21. An impeding structure in the form of a plate 26 comprised of electrically nonconducting material is disposed between the two electrodes (30a, 30b). This plate 26 causes the path lengths of the electric field lines 36 to decrease with increases in the value of z. This impeding structure causes the same effect as with a corresponding variation of the difference between mutually separated electrodes. The plate 26 has a width $B_a(z)$ which decreases with increasing z, whereby the path lengths of the field lines to the two electrodes (30a, 30b) decrease with progression upward. Despite the fact that the physical distance between the two electrodes on the support plate 21 is small, the impeding plate 26 provides an effective distance D between the two electrodes (30a, 30b) (as a measure of the path lengths of the electric field lines) which distance decreases exponentially with progression in the vertically upward direction, The functional relationship between $B_a$ and $V(z)$ is $B_a(V(z)) \sim b_{a_1}^{-V(z)} \sim b_{a_2}^{-z}$, which describes the exponentially curved forward edge 27 of the plate 26.

Figure 12A:
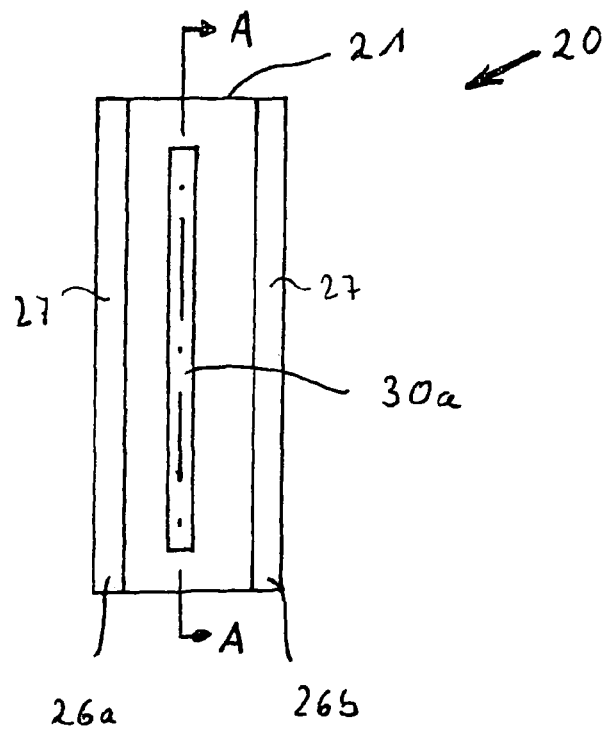
FIGS. 12a to 12c are two lateral views and a plan view of a measuring element, according still another embodiment.
Figure 12B:
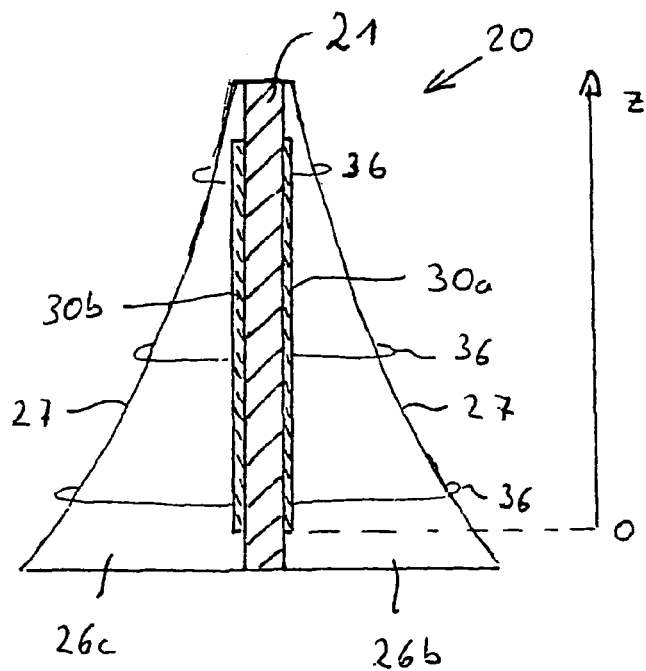
Figure 12C:
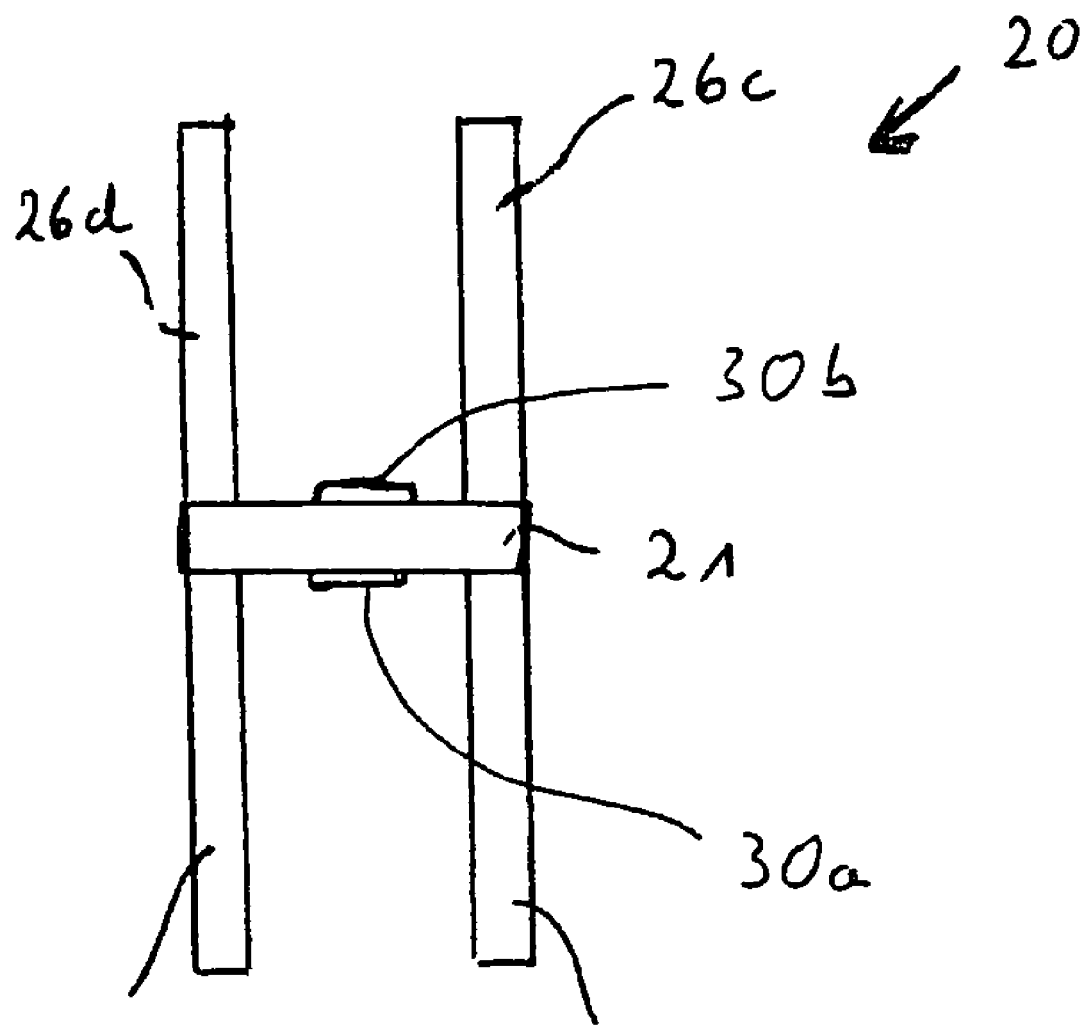

In FIGS. 12a to 12c, a modification of this embodiment is illustrated; FIG. 12b is a cross section through line A-A of FIG. 12a. The two electrodes (30a, 30b) are disposed on opposite faces of the support plate 21. In order to provide for shorter path lengths of the field lines 36 as the value of z is increased, inhibiting plates (26a, 26b; 26c, 26d) are provided on both sides of each electrode (30a; 30b). The functional relationship between the distance between the two electrodes (30a, 30b) relevant for the field lines is analogous to the functional relationship described in connection with FIGS. 11a and 11b.

Figure 13:
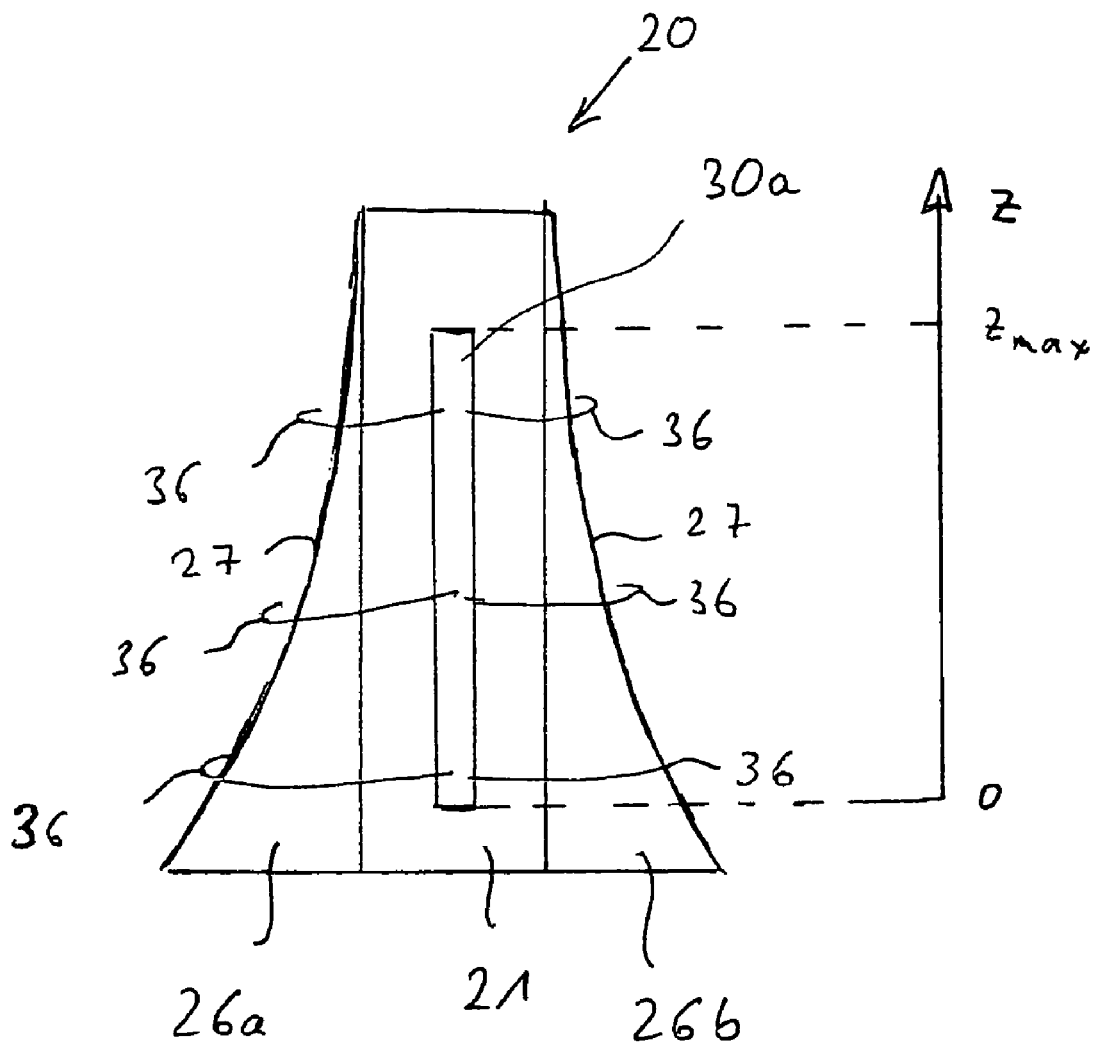
FIG. 13 is a lateral view of a measuring element according to a further embodiment.

FIG. 13 illustrates yet another embodiment, with the two electrodes (30a, 30b) disposed on opposite sides of the support plate 21. The two impeding plates (26a, 26b) the use of which results in reduction of the path lengths of the electric field lines 36 as z is increased, are here disposed in the plane of the support element 21 and may indeed be components of the support plate 21.

FIG. 14 illustrates an embodiment of the measuring element according to FIG. 11a, wherein the evaluation device 12 and display unit 13 are incorporated in the subassembly, along with current sources. The subassembly can be inserted and mounted in a container.

LIST OF REFERENCE NUMERALS 1 water filter device.
2 pitcher-like container.
3 handle.
4 cover.
5 liquid container.
5a feed funnel.
6a peripheral wall.
6b bottom wall.
7a inlet.
7b outlet.
8 raw water.
9 filtered water.
10 measuring device.
10a conductivity measuring device.
11 electrical connecting line.
12 evaluation device.
13 display unit.
20 measuring element.
21 support plate.
22a, 22b foot.
23 recess.
24 middle web member plate.
25a, 25b flange.
26 plate.
26a, 26b plate.
27 forward edge.
30a, 30b measuring electrode.
31 first end of electrode.
32 second end of electrode.
33 contact element.
34 contact fitting ("contact pill").
35 bar-like widened region.
36 electric field lines.
37 envelope curve.
38 step.
40 surface of liquid.
41 liquid.
42 maximum altitude of liquid level.
50 filter cartridge.

What is claimed is:

1. A measuring device for determination of flow amounts, $dV(z)$, of electrically conducting liquids having conductivity LF, for flow through a container in which the liquid level varies in the vertical direction (z-direction), which device is comprised of:
   a container having: a bottom wall, a liquid inlet, and a liquid outlet; and
   a conductivity measuring device comprised of the following components:
      a voltage source;
      an evaluation device; and
      at least one measuring element, which measuring element:
         is disposed in the container and is connected to the evaluation device; and
         has at least two electrodes which extend in the z-direction, which electrodes are disposed a distance apart in a direction perpendicular to the z-direction, wherewith $Z_{max}$
         represents a distance from a first end (lower end) of the electrode (at z=0) to a second end (upper end) of the electrode; wherein at time intervals $t_i - t_{i-1}$ (for i=1 ... n), the conductivity measuring device delivers measurement values $$M_{t_i}(V) = M(V(z)) \sim LF \cdot f_M(V(z));$$

wherein at least the container or the conductivity measuring device or a combination thereof is configured such that it is or they are describable by at least one parameter function dependent on V(z), $f_{P_I}(V(z))$ (for I=1 ... m), so that the following applies:

$$f_M(V(z)) \sim f(f_{P_I}(V(z)) \text{ for } I=1 \ldots m)) \sim b_M^{V(z)},$$

where $b_M$ is a number which is not equal to zero or 1;
wherein the evaluation device is configured at least so as to be able to deliver quotients of the measured values and to obtain logarithms of the quotients.

2. The measuring device according to claim 1, wherein the parameter $P_I$ represents a configuration of the container, F, from which a fill volume is determined, wherewith F is expressed by:

$$F(V(z)) = f_{P_I}(V(z)) \sim b_F^{V(z)}.$$

3. The measuring device according to claim 1, wherein the measuring element is integrated into a wall of the liquid container.

4. The measuring device according to claim 1, wherein the liquid container comprises a feed funnel of a water filter device.

5. A conductivity measurement device for determination of flow amounts, $dV(z)$, of electrically conducting liquids for situations in which the liquid level varies in the vertical direction (z-direction), which device is comprised of:
   a voltage source;
   an evaluation device; and
   at least one measuring element, which measuring element:
      is connected to the evaluation device; and
      has at least two electrodes which extend in the z-direction, which electrodes are disposed a distance apart in a direction perpendicular to the z-direction, wherewith $Z_{max}$
      represents a distance from a first end (lower end) of the electrode (at z=0) to a second end (upper end) of the electrode; wherein at time intervals $t_i - t_{i-1}$ (for i=1 ... n), the conductivity measuring device delivers measurement values $$M_{t_i}(V) = M(V(z)) \sim LF \cdot f_M(V(z));$$

further in that the conductivity measuring device is configured such that it is describable by at least one parameter function dependent on V(z), $f_{P_I}(V(z))$ (for I=1 ... m), so that the following applies:

$$f_M(V(z)) \sim f(f_{P_I}(V(z)) \text{ for } I=1 \ldots m) \sim b_M^{V(z)}$$

where $b_M$ is a number which is not equal to zero or 1;
and in that the evaluation device is configured at least so as to be able to deliver quotients of the measured values and to obtain logarithms of the quotients.

6. The device according to claim 1, wherein for at least one parameter function the following applies:
$f_{P_I}(V(z)) \sim b_{P_I}^{V(z)}$, wherewith preferably $0 < b_{P_I} \leq 5$, and $b_{P_I} \neq 1$, and wherewith z is expressed in centimeters.

7. The device according to claim 6, wherein at least one parameter $P_I$ is selected such that $f_{P_I}(V(z)) \sim b_{P_I}^{V(z)}$, wherewith preferably $1 < b_{P_I} \leq 1.5$ and wherewith z is expressed in centimeters.

8. The device according to claim 1, wherein the parameter $P_I$ is an area A of at least one of the electrodes; and in that the area A is expressed as follows:

$$A(V(z)) = f_{P_I}(V(z)) \sim b_{A_I}^{V(z)}.$$

9. The device according to claim 1, wherein the parameter $P_I$ is the distance D between the electrodes; and in that the distance D is expressed as follows:

$$D(V(z))=f_{P_I}(V(z))\sim b_D^{-V(z)}.$$

10. The device according to claim 1, wherein the measuring element has a support element; and in that the two electrodes are disposed on opposite sides or faces of the support element.

11. The device according to claim 1, wherein the measuring element is disposed in the liquid container in such a manner that the broad second end of the electrode is disposed at the top.

12. The device according to claim 1, wherein the evaluation device is connected to a display unit.

13. The device according to claim 1, wherein at least the voltage source, the evaluation device, and at least one measuring element are integrated into a single module or subassembly.

14. The device according to claim 13, wherein the display unit is integrated into the module or subassembly.

15. The device according to claim 1, wherein at least one element is disposed between the two electrodes, which element changes a path length of electric field lines which form between the two electrodes.

16. The device according to claim 15, wherein said element is configured such that the path lengths of the electric field lines decrease exponentially with increasing value of z.

17. The device according to claim 15, wherein said element is a plate having a curved free forward edge.

18. The device according to claim 17, wherein the two electrodes are disposed side by side on a support element, and in that the plate is disposed between the two electrodes.

19. The device according to claim 15, wherein the two electrodes are disposed on opposite sides or faces of a support element, and in that each electrode has a respective plate disposed laterally of and close to it.

20. The device according to claim 18, wherein the plate is disposed perpendicularly to the support element.

21. The device according to claim 1 wherein the device is a volumetric load measuring device for filter cartridges.

22. The device according to claim 21, wherein the measuring device has a display unit which indicates when the filter cartridge is due to be replaced.

23. A method of determining the overall amount of flow, dV, of electrically conducting liquids of conductivity LF, through a container in which the liquid level varies in the vertical direction (z-direction), which method employs a container and device for measuring conductivity; comprising the following steps:

configuring at least the container or the conductivity measuring device or a combination thereof such that it is or they are describable by at least one parameter function dependent on V(z), $f_{P_I}(V(z))$ (for I=1 . . . m);

devising or adapting the at least one parameter function, $f_{P_I}(V(z))$, such that for the measurement values delivered by the conductivity measuring device:

$$M(V(z))\sim LF \cdot f_M(V(z))\sim f(f_{P_I}(V(z)))\sim b_M^{V(z)};$$

carrying out a measurement to determine the basis, $b_M$;

determining measured values $M_{t_i}(V(z))$ at time intervals $t_i-t_{i-1}$ (for i=1 . . . n);

determining quotients $M_{t_{i+1}}/M_{t_i}$, and determining the logarithms of such quotients, in order to determine $dV_i$; and adding together the n-fold values $dV_i$, to determine the overall amount, dV, which has flowed through.

24. The method according to claim 23, wherein the measurement values $M_{t_i}$ are determined at time intervals in the range of 1 to 100 seconds.

25. The method according to claim 23, wherein the measurement values $M_{t_i}$ are determined at time intervals in the range of 1 to 20 sec.

* * * * *